(12) United States Patent
Krupnick

(10) Patent No.: US 6,860,912 B2
(45) Date of Patent: Mar. 1, 2005

(54) ABRASIVE FILAMENT, ABRASIVE ARTICLES INCORPORATING ABRASIVE FILAMENT AND METHOD OF MAKING ABRASIVE FILAMENTS AND ABRASIVE ARTICLES

(75) Inventor: Steven Krupnick, Philadelphia, PA (US)

(73) Assignee: Webb Manufacturing Corporation, Philadelphia, PA (US)

(*) Notice: Subject to any disclaimer, the term of this patent is extended or adjusted under 35 U.S.C. 154(b) by 0 days.

(21) Appl. No.: 10/358,045

(22) Filed: Feb. 4, 2003

(65) Prior Publication Data

US 2004/0148866 A1 Aug. 5, 2004

(51) Int. Cl.$^7$ .................................................. C09K 3/14
(52) U.S. Cl. ........................... 51/298; 51/297; 51/307; 51/308; 51/309; 51/293; 51/295
(58) Field of Search .......................... 51/295, 297, 298, 51/307, 308, 309, 293, 294; 264/176.1, 211, 211.12

(56) References Cited

U.S. PATENT DOCUMENTS

| | | | |
|---|---|---|---|
| 3,947,169 A | 3/1976 | Wolff et al. | |
| 3,963,458 A | 6/1976 | Gladstone et al. | |
| 3,997,302 A | 12/1976 | Supkis | |
| 4,027,435 A | 6/1977 | Malloy | |
| 4,715,150 A | 12/1987 | Takeuchi | |
| 5,427,595 A | * 6/1995 | Pihl et al. | ..................... 51/298 |
| 5,571,296 A | 11/1996 | Barber, Jr. et al. | |
| 5,591,239 A | 1/1997 | Larson et al. | |
| 5,616,411 A | 4/1997 | Barber, Jr. et al. | |
| 5,849,052 A | * 12/1998 | Barber, Jr. | ................... 51/298 |
| 5,863,305 A | 1/1999 | Beardsley | |
| 6,287,353 B1 | 9/2001 | Celikkaya | |

* cited by examiner

*Primary Examiner*—Michael Marcheschi
(74) *Attorney, Agent, or Firm*—Caesar, Rivise, Bernstein, Cohen & Pokotilow, Ltd.

(57) ABSTRACT

An abrasive filament, a cloth or non-woven made of the filament and an abrasive device, e.g., sanding disk, incorporating the fabric, cloth or non-woven and methods of producing the same are disclosed. The filament has an outer surface to which plural small size particles of an abrasive material are secured. The filament is formed from a mass of a molten polymer material, e.g., nylon, that has been extruded through a small diameter opening to form a hot elongated filamentary body. The abrasive particles, e.g., grit, are applied as a cloud or spray to the outer surface of the hot elongated filamentary body, whereupon they adhere to that surface and remain permanently secured thereto.

60 Claims, 2 Drawing Sheets

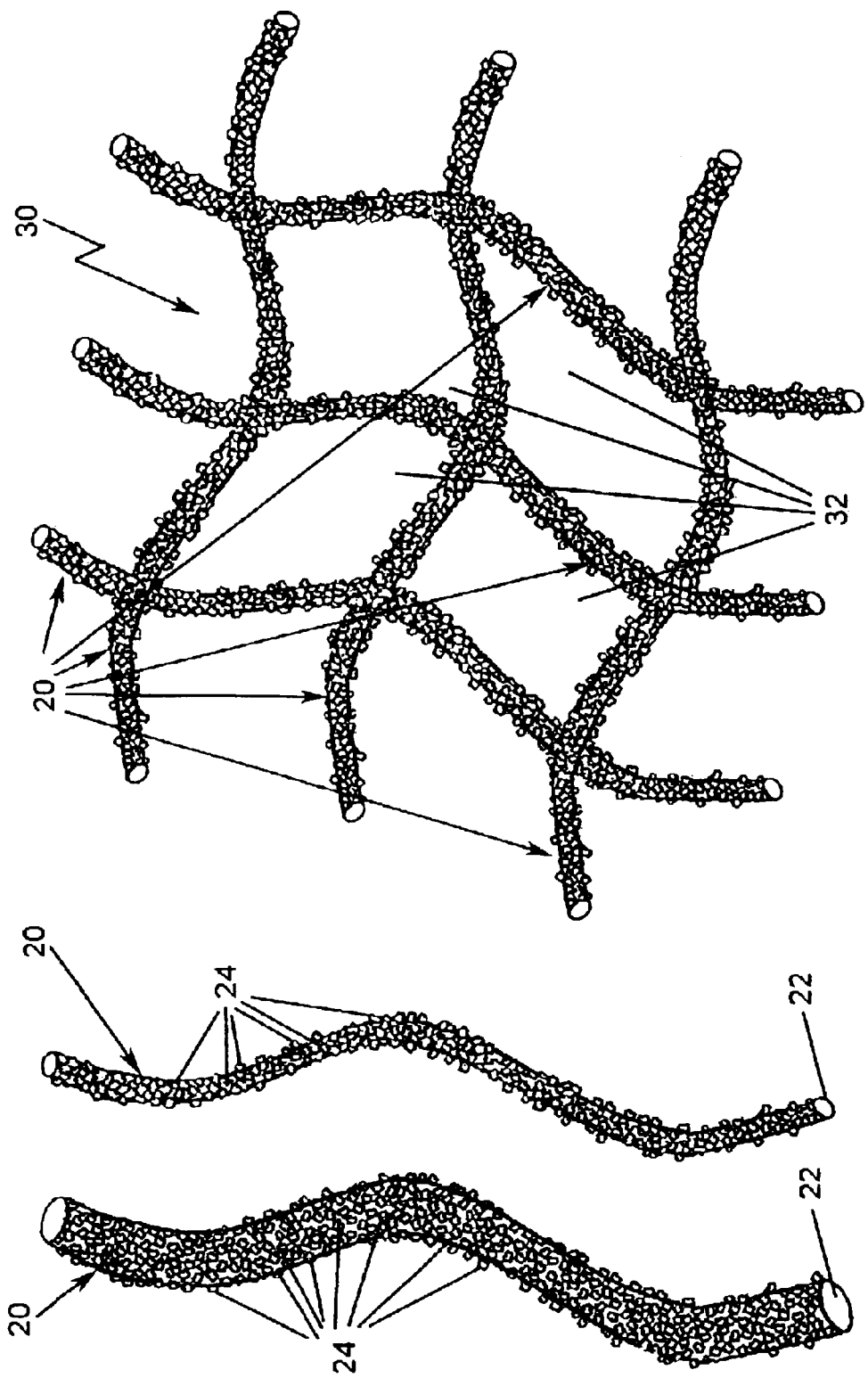

ABRASIVE FILAMENT, ABRASIVE ARTICLES INCORPORATING ABRASIVE FILAMENT AND METHOD OF MAKING ABRASIVE FILAMENTS AND ABRASIVE ARTICLES

FIELD OF THE INVENTION

This invention relates to generally to abrasive articles and more particularly to abrasive filaments or fibers for use themselves as abrasive devices, fabrics or non-wovens made up of such filaments or fibers for use as abrasive devices or for incorporation into other abrasive devices or structures, e.g., sanding or polishing disks, and methods of making such filaments, fabrics or non-wovens and other abrasive devices or structures.

BACKGROUND OF THE INVENTION

The prior art is replete with abrasive devices made out of some substrate and having abrasive particles or grit secured thereto. See for example: U.S. Letters Pat. No. 3,963,458 (Gladstone et al.), U.S. Pat. No. 3,997,302 (Supkis), and U.S. Pat. No. 4,027,435 (Malloy). One of the most common abrasive devices comprises a paper or plastic sheet or disk on which a plurality of abrasive particles are adhesively secured. Other types of abrasive devices comprise fabrics or non-wovens having a filament structure on which abrasive particles are adhesively secured. See for example, U.S. Letters Pat. No. 6,287,353 (Celikkaya) which discloses an open lofty polymer, e.g., polyester, polyamide, and polyaramid, non-woven filament or fiber structure having abrasive grains distributed throughout the structure and adherently bonded therein by an organic binder.

U.S. Letters Pat. No. 3,947,169 discloses abrasive-filled plastic rods or tubes as a man-made alternative to natural abrasive filaments. The apparatus of that patent is in the form of extrusion cylinders which are arranged for receiving plastic molding pellets. The pellets may be thermoplastic or thermosetting, are rendered to a semi-liquid state in the apparatus and then a filler, grit, is introduced into the plastic so that the liquid or semi-liquid state of the plastic envelops the filler.

Other arrangements for applying an abrasive coating on fibers or filaments are shown in the following U.S. Letters Pat. No. 4,715,150 (Takeuchi, et al.); U.S. Pat. No. 5,491,025 (Pihl, et al.); U.S. Pat. No. 5,571,296 (Barber, Jr., et al.); U.S. Pat. No. 5,591,239 (Larson, et al.); U.S. Pat. No. 5,616,411 (Barber, et al.); and U.S. Pat. No. 5,863,305 (Beardsley, et al.).

While the prior art abrasive devices making use of abrasive fibers and apparatus and methods for producing them are generally suitable for their intended purposes, they still leave much to be desired from one or more of various standpoints, e.g., ease of manufacture, ease of incorporation into other abrasive products, fineness of abrasiveness, ease and effectiveness of use, etc.

SUMMARY OF THE INVENTION

One aspect of this invention is an abrasive filament or fiber that is suitable for use by itself or for incorporation into other structures for abrasive applications. Another aspect of the invention constitutes methods of making the abrasive filament and the abrasive structures incorporating it.

The abrasive filament has an outer surface to which plural, small size particles of an abrasive material are secured. The filament is formed from a mass of a molten polymer material that has been extruded through a small diameter opening to form a hot elongated filamentary body. The abrasive particles are exposed from the outer surface, e.g., they are applied as a cloud or spray onto the outer surface of the hot elongated filamentary body, whereupon the abrasive particles adhere to that surface and remain permanently secured thereto when the filamentary body cools to form the filament.

The abrasive filament can be made into abrasive cloths, fabrics or non-woven in accordance with another aspect of this invention. Further still, the abrasive cloths, fabrics or non-wovens can themselves be incorporated into other abrasive devices, e.g., abrasive cloths can be secured to a surface of a substrate, such as a disk, to form a sanding or polishing disk.

DESCRIPTION OF THE DRAWING

FIG. 2A is a greatly enlarged isometric view of one exemplary embodiment of the abrasive filament produced by the system of FIG. 1;

FIG. 2B is an isometric view, similar to FIG. 2A, but showing another exemplary embodiment of the abrasive filament produced by the system of FIG. 1;

FIG. 3 is an isometric view showing a portion of an abrasive cloth or fabric constructed in accordance with another aspect of this invention and utilizing the filament of FIG. 2B (or any other filament constructed in accordance with this invention)

DETAILED DESCRIPTION OF THE PREFERRED EMBODIMENT

Figure 1:
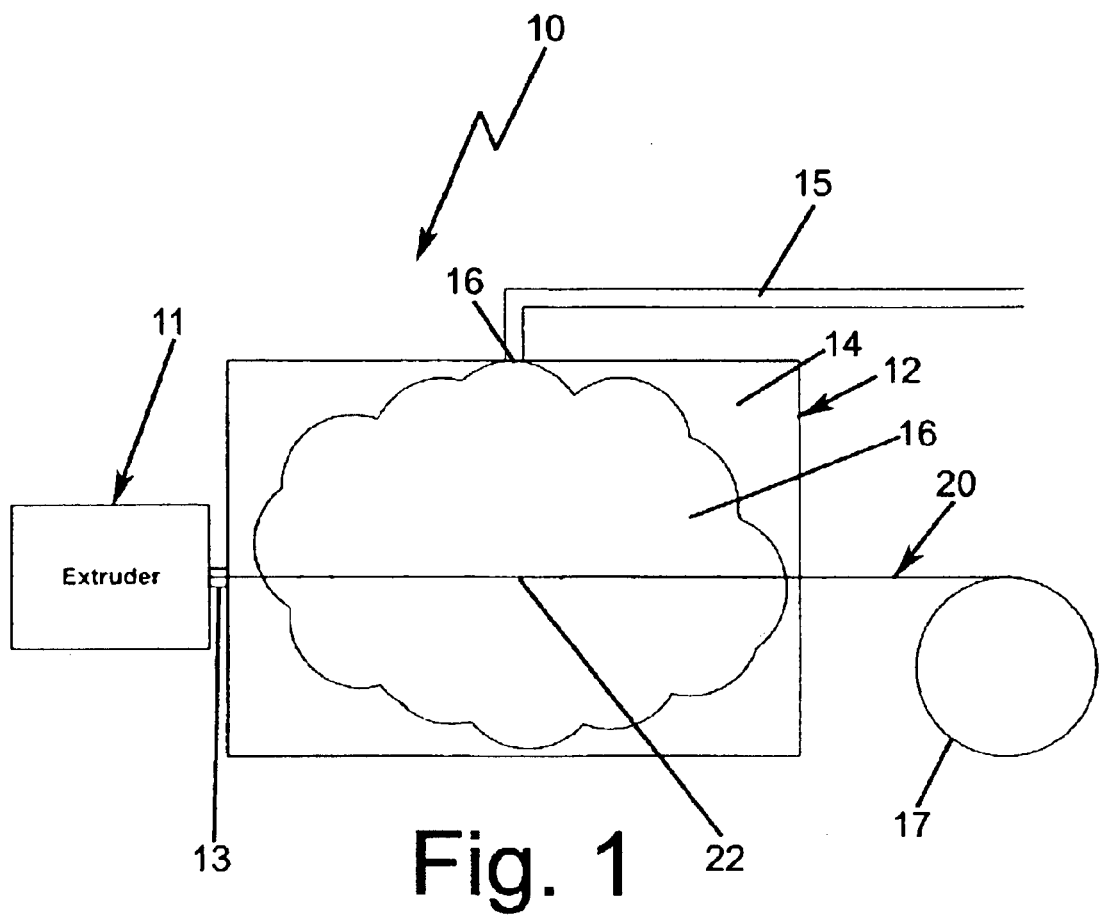
FIG. 1 is a schematic diagram of a system constructed in accordance with one aspect of this invention for producing an abrasive filament constructed in accordance with another aspect of this invention.

In FIG. 1 there is shown at 10 a system for forming an abrasive filament, thread or fiber 20 constructed in accordance with this invention. The abrasive filament 20 is best seen in FIGS. 2A and 2B and basically comprises a thin, elongated filamentary member or body 22 that may be in the form of a single fiber (e.g., a mono-filament) or plural fibers or filaments. A plurality of abrasive particles 24 are secured to the filamentary body 22 so that portions of the particles are exposed, e.g., extend beyond the surface of the filamentary body.

The details of the filamentary body 22 and the particles 24, will be described later. Suffice it for now to state that the particles are hard members, e.g., grit, and can be irregularly shaped or regularly shaped, so long as they exhibit sharp corners and/or edges so that when secured to the filamentary body they provide an abrasive exposed surface. In order to ensure that the particles 24 are securely affixed to the filamentary body, as will be described later in accordance with one exemplary aspect of this invention, they are applied to the filamentary body during its formation, e.g., while it is hot, so that a portion of each particle 24 adheres to the surface of the filamentary body 22 or else is partially embedded therein. This offers various advantages over prior art techniques involving securing abrasive particles to the outer surface of a fiber or filament by means of an adhesive or polymer layer.

The particles 24 can be any type of material used for abrasive applications, e.g., iron oxide, emery, silicon carbide, aluminum oxide, zirconia alumina and ceramic alumina. The size of the particles 24 used is dependent upon the diameter of the filamentary body 22 and the amount of abrasiveness desired for the resulting filament 20. In accordance with one exemplary aspect of this invention the particles 24 are quite small, e.g., approximately 10 micrometers or less in diameter. Such particles, when secured to a fine filamentary body, e.g., a body on the order of approximately 400 denier, enable one to produce abrasive devices that are particularly suitable for fine finishing or polishing applications, e.g., fine finishing of automobile paint. It should, of course, be apparent to those skilled in the art that other sizes of particles and other sizes of filaments can be used in lieu of the above described examples, depending upon the desired abrasiveness and the application to which the abrasive filament will be utilized.

In FIGS. 2A and 2B there is shown two exemplary embodiments of filaments constructed in accordance with this invention, the difference being in the diameter of their respective filamentary bodies 22.

The system 10 for carrying out the method of fabricating the filament entails the use of an extrusion device or extruder 11 along with an abrasive particle applicator 12. The extruder 11 is a conventional device that is arranged to receive a polymer, e.g., nylon, for forming the filamentary body 22. Other polymers than nylon can be used, Irrespective of the type of polymer used, it is typically introduced into the extruder in the form of small pellets or other small media particles or granules. The polymer media is heated in the extruder 11 to cause it to melt, and the molten polymer is drawn out of the extruder through a very small diameter outlet nozzle 13 to form an elongated, e.g., continuous, filamentary body 22. The filamentary body 22 exiting the extruder nozzle 13 is hot and its outer surface is still somewhat molten or at least tacky.

The hot elongated filamentary body 22 exiting the nozzle 13 enters into the abrasive particle applicator 12. In accordance with one preferred aspect of this invention the particle applicator comprises a device having an interior chamber 14 through which the filamentary body 22 is drawn. A conduit 15 is provided to carry a plurality of very small or fine abrasive particles 24 from some remote source (not shown) to the chamber 14. In particular, the fine particles are introduced, e.g., pumped, via the conduit 15 to a spray port 16 in communication with the interior of the chamber 14, whereupon the particles 24 form a dispersed cloud or spray 16 in the chamber 14. Since the outer surface of the elongated filamentary body 22 being drawn through the chamber 14 is still hot and thus either molten or tacky, the fine particles 24 of the cloud that make contact with that surface adhere to it. In fact, some portions of the of adhering particles may actually be slightly embedded in the hot elongated filamentary body, depending upon the degree to which its surface is molten at the time of adherence. In any case, as best seen in FIGS. 2A and 2B portions of the particles 24 project upward from the outer surface of the elongated filamentary body 22. Those projecting portions include sharp corners or edges, thereby producing an abrasive exterior surface. The filamentary body 22 with the adhered abrasive particles 24 exits the applicator chamber 14 and is allowed to cool to ensure that the particles 24 are permanently secured thereto. The resulting abrasive filament 20 can then be reeled up into a reel 17 for subsequent use.

To that end, the filament 20 can be used by itself for extremely fine abrasive applications, e.g., applications requiring an fine abrasive filament to be pulled through a very small diameter opening or crevice to smooth or polish the contiguous surfaces. A more likely and common application of the filament 20 is for use in forming a woven, knitted or non-woven fabric or cloth exhibiting abrasive properties. FIG. 3 shows one such application for the abrasive fiber 20 of this invention. In particular, as can be seen therein one or more abrasive filaments or fibers 20 of this invention are formed, e.g., woven, into a flexible fabric 30. The filaments/fibers 20 making up the fabric 30 can be of any diameter desired and can make use of any size abrasive particles desired for the particular application. For fine finishing applications, such as the heretofore mentioned fine finishing of automobile paint, the cloth is formed of nylon fibers of approximately 400 denier and the particles are of approximately 5–10 micrometers. For such applications, the filaments are woven so that relatively large interstitial spaces 32 exist between adjacent fibers 20 to render the fabric 30 breathable, e.g., enable air to pass freely therethrough, and resistant to clogging. These open interstitial spaces 32 enable the abrasive fabric 30 to be able to temporarily hold debris or dust produced by the use of the fabric, without clogging or otherwise detracting from the abrasion/polishing application. Moreover, any debris that finds its way into the interstitial spaces, can be readily removed by either shaking the fabric or by vacuuming it, thereby enabling long term use of the abrasive fabric. Further still, as will be appreciated by those skilled in the art, breathable abrasive fabrics 30 constructed in accordance with this invention are particularly suitable for wet sanding applications, such as finishing coats on automobiles or other hard surfaces that need a very high end finish, since water will be held within the interstitial spaces as the fabric is used.

It must be pointed out at this juncture that the woven fabric 30 as described above is merely exemplary. Thus, abrasive fibers of this invention can be woven into tighter fabrics than that shown and described above. Moreover, such fabrics need not be woven, but can be knitted or otherwise formed of intersecting or interconnected fibers, such as by knitting. In fact, the fabric may be in the form of a non-woven, constructed of short sections of abrasive fibers that are entangled with one another to form a flexible sheet.

Figure 4:
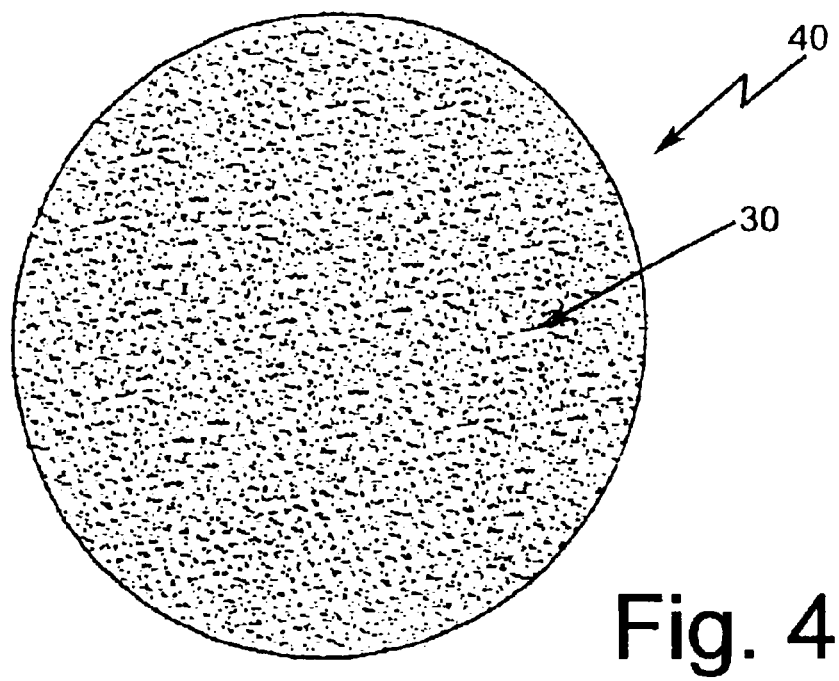
FIG. 4 is a reduced plan view of an abrasive disk constructed in accordance with another aspect of this invention and utilizing the cloth of FIG. 3 (or any other woven, knitted or non-woven fabric constructed in accordance with this invention).

Irrespective of the make-up of the fabric 30, the fabric itself may be incorporated into an abrasive device or structure. For example, as shown in FIG. 4, a sanding or polishing disk 40 may be constructed in accordance with this invention by providing a disk like substrate, e.g., a plastic disk having a foam surface (not shown), to which a circular section of a cloth 30 constructed in accordance with this invention is adhesively secured.

It should be pointed out at this juncture that while the filaments or fibers 20 of this invention are preferably formed by extruding a polymer into a filamental body and applying abrasive particles or grit to the surface of that body while it is still hot, that process is not exclusive. Thus, the subject invention contemplates mixing or introducing the abrasive particles into the mass of molten polymer so that the particles are in situ when the filament is extruded. In such an application, portion of the particles contiguous with the surface of the filament will be exposed to produce the desired abrasive surface.

Without further elaboration the foregoing will so fully illustrate my invention that others may, by applying current or future knowledge, adopt the same for use under various conditions of service.

I claim:

1. An abrasive filament having an outer surface to which plural small size particles of an abrasive material are secured, said filament being formed from a mass of a molten polymer material that has been extruded through a small diameter opening to form a hot elongated filamentary body, said abrasive particles being applied to said outer surface of said hot elongated filamentary body, whereupon all of said abrasive particles adhere directly to said outer surface of said hot elongated filamentary body and remain permanently secured thereto when said elongated filamentary body cools to form an abrasive filament having all of said abrasive particles directly secured to said polymer material at the surface thereof.

2. The abrasive filament of claim 1 wherein said abrasive particles are applied as a cloud or spray to said outer surface of said hot elongated filamentary body.

3. The abrasive filament of claim 1 wherein said polymer material is nylon.

4. The abrasive filament of claim 1 wherein said abrasive particles are selected from the group consisting of iron oxide, emery, silicon carbide, aluminum oxide, zirconia alumina and ceramic alumina.

5. The abrasive filament of claim 3 wherein said abrasive particles are selected from the group consisting of iron oxide, emery, silicon carbide, aluminum oxide, zirconia alumina and ceramic alumina.

6. The abrasive filament of claim 1 wherein said abrasive particles are approximately 10 micrometers or less in size.

7. The abrasive filament of claim 2 wherein said abrasive particles are approximately 10 micrometers or less in size.

8. The abrasive filament of claim 5 wherein said abrasive particles are approximately 10 micrometers or less in size.

9. The abrasive filament of claim 1 wherein said filament is approximately 400 denier.

10. The abrasive filament of claim 9 wherein said abrasive particles are approximately 10 micrometers or less in size.

11. An abrasive cloth or mesh formed of at least one abrasive filament, said filament being formed from a mass of a molten polymer material that has been extruded to form a hot elongated filamentary body having and outer surface and plural small size particles of an abrasive material, substantially all of said particles being directly secured to the outer surface of said body by the polymer material of said body, at least some of said particles having portions exposed from said outer surface.

12. The abrasive cloth of claim 11 wherein said small size abrasive particles are applied to said outer surface of said hot elongated filamentary body in a cloud or spray, whereupon said abrasive particles adhere to said surface and remain permanently secured thereto when said elongated filamentary body coals to form said abrasive filament.

13. The abrasive cloth of claim 11 wherein said polymer material is nylon.

14. The abrasive cloth of claim 11 wherein said abrasive particles are selected from the group consisting of iron oxide, emery, silicon carbide, aluminum oxide, zirconia alumina and ceramic alumina.

15. The abrasive cloth of claim 13 wherein said abrasive particles are selected from the group consisting of iron oxide, emery, silicon carbide, aluminum oxide, zirconia alumina and ceramic alumina.

16. The abrasive cloth of claim 11 wherein said abrasive particles are approximately 10 micrometers or less in size.

17. The abrasive cloth of claim 13 wherein said abrasive particles are approximately 10 micrometers or less in size.

18. The abrasive cloth of claim 14 wherein said abrasive particles are approximately 10 micrometers or less in size.

19. The abrasive cloth of claim 15 wherein said abrasive particles are approximately 10 micrometers or less in size.

20. An abrasive device comprising a substrate and an abrasive cloth, mesh or non-woven formed of at least one filament, said at least one filament of a polymer material and having an outer surface from which plural small size particles of an abrasive material are exposed, all of said particles being directly secured to said outer surface of said filament by the polymer material of said filament, said substrate having a surface, said abrasive cloth, mesh or non-woven being secured onto said surface of said substrate.

21. The abrasive device of claim 20 wherein said filament is formed from a mass of a molten polymer material that has been extruded through a small diameter opening to form a hot elongated filamentary body, said abrasive particles being applied as a cloud or spray to said outer surface of said hot elongated filamentary body, whereupon said abrasive particles adhere to said surface and remain permanently secured thereto when said filamentary body cools to form said abrasive filament.

22. The abrasive device of claim 21 wherein said polymer material is nylon.

23. The abrasive device of claim 21 wherein said abrasive particles are selected from the group consisting of iron oxide, emery, silicon carbide, aluminum oxide, zirconia alumina and ceramic alumina.

24. The abrasive device of claim 22 wherein said abrasive particles are selected from the group consisting of iron oxide, emery, silicon carbide, aluminum oxide, zirconia alumina and ceramic alumina.

25. The abrasive device of claim 21 wherein said abrasive particles are approximately 10 micrometers or less in size.

26. The abrasive device of claim 22 wherein said abrasive particles are approximately 10 micrometers or less in size.

27. The abrasive device of claim 23 wherein said abrasive particles are approximately 10 micrometers or less in size.

28. The abrasive device of claim 24 wherein said abrasive particles are approximately 10 micrometers or less in size.

29. The abrasive device of claim 20 wherein said device comprises a sanding or polishing disk.

30. A method of making an abrasive filament comprising:
   (A) extruding a mass of a molten polymer material through a small diameter opening in an extruding device to form a hot elongated filamentary body having an outer surface,
   (B) applying a cloud or spray of a plurality of small abrasive particles to said hot elongated filamentary body to cause all of said abrasive particles to directly adhere to said outer surface of said hot elongated filamentary body, and
   (C) allowing said hot elongated filamentary body with said abrasive particles adhered thereto to cool, whereupon virtually all of said abrasive particles are permanently secured to said outer surface of the filamentary body to form said abrasive filament by the polymer material of said filamentary body, with portions of at least some of said abrasive particles being exposed.

31. The method of claim 30 wherein said abrasive particles are applied to said hot elongated filamentary body in a cloud or spray.

32. The method of claim 30 wherein said polymer material is nylon.

33. The method of claim 30 wherein said abrasive particles are selected from the group consisting of iron oxide, emery, silicon carbide, aluminum oxide, zirconia alumina and ceramic alumina.

34. The method of claim 32 wherein said abrasive particles are selected from the group consisting of iron oxide, emery, silicon carbide, aluminum oxide, zirconia alumina and ceramic alumina.

35. The method of claim 30 wherein said abrasive particles are approximately 10 micrometers or less in size.

36. The method of claim 32 wherein said abrasive particles are approximately 10 micrometers or less in size.

37. The method of claim 33 wherein said abrasive particles are approximately 10 micrometers or less in size.

38. The method of claim 34 wherein said abrasive particles are approximately 10 micrometers or less in size.

39. The method of claim 31 wherein said cloud of abrasive particles is applied in a chamber located immediately adjacent said opening in said extruding device.

40. A method of making an abrasive fabric, cloth or non-woven member comprising:
   (A) extruding a mass of a molten polymer material through a small diameter opening in an extruding device to form a hot elongated filamentary body having an outer surfaces, applying a cloud or spray of a plurality of small abrasive particles to said outer surface of said hot elongated filamentary body whereupon all of said small abrasive particles are directly adhered thereto, a portion of at least some of said plurality of small abrasive particles being exposed,
   (B) allowing said filamentary body to cool to form at least one abrasive filament, and
   (C) forming said at least one filament into a fabric, cloth or non-woven member.

41. The method of claim 40 additionally comprising exposing said hot elongated filamentary body to a cloud or spray of abrasive particles to cause said abrasive particles to adhere to said outer surface of said hot elongated filamentary body, whereupon said abrasive particles are permanently secured to said outer surface.

42. The method of claim 40 said polymer material is nylon.

43. The method of claim 40 wherein said abrasive particles are selected from the group consisting of iron oxide, emery, silicon carbide, aluminum oxide, zirconia alumina and ceramic alumina.

44. The method of claim 42 wherein said abrasive particles are selected from the group consisting of iron oxide, emery, silicon carbide, aluminum oxide, zirconia alumina and ceramic alumina.

45. The method of claim 40 wherein said abrasive particles are approximately 10 micrometers or less in size.

46. The method of claim 42 wherein said abrasive particles are approximately 10 micrometers or less in size.

47. The method of claim 43 wherein said abrasive particles are approximately 10 micrometers or less in size.

48. The method of claim 44 wherein said abrasive particles are approximately 10 micrometers or less in size.

49. The method of claim 41 wherein said cloud of abrasive particles is applied in chamber located immediately adjacent said opening in said extruding device.

50. A method of making an abrasive device comprising:
   (A) extruding a mass of a molten polymer material through a small diameter opening in an extruding device to form a hot elongated filamentary body having an outer surface, applying a cloud or spray of a plurality of small abrasive particles to said outer surface of said hot elongated filamentary body, whereupon all of said small abrasive particles are directly adhered thereto,
   (B) allowing said hot elongated filamentary body cool to form an abrasive filament,
   (C) forming said filament into a fabric, cloth or non-woven member, and
   (D) securing said fabric, cloth or non-woven member onto the surface of a substrate to form said abrasive device.

51. The method of claim 50 wherein said abrasive particles are applied as a cloud or spray to said hot elongated filamentary body to cause said abrasive particles to adhere to said outer surface of said hot elongated filamentary body.

52. The method of claim 50 wherein said polymer material is nylon.

53. The method of claim 50 wherein said abrasive particles are selected from the group consisting of iron oxide, emery, silicon carbide, aluminum oxide, zirconia alumina and ceramic alumina.

54. The method of claim 52 wherein said abrasive particles are selected from the group consisting of iron oxide, emery, silicon carbide, aluminum oxide, zirconia alumina and ceramic alumina.

55. The method of claim 50 wherein said abrasive particles are approximately 10 micrometers or less in size.

56. The method of claim 52 wherein said abrasive particles are approximately 10 micrometers or less in size.

57. The method of claim 53 wherein said abrasive particles are approximately 10 micrometers or less in size.

58. The method of claim 54 wherein said abrasive particles are approximately 10 micrometers or less in size.

59. The method of claim 51 wherein said cloud of abrasive particles is applied in a chamber located immediately adjacent said opening in said extruding device.

60. The method of claim 50 wherein said substrate comprises a disk.

* * * * *